United States Patent [19]

Smader

[11] 4,070,711
[45] Jan. 24, 1978

[54] DOUGH HOOK ATTACHMENT FOR KITCHEN MIXER

[75] Inventor: C. Louis Smader, Cheshire, Conn.

[73] Assignee: Scovill Manufacturing Company, Waterbury, Conn.

[21] Appl. No.: 781,164

[22] Filed: Mar. 25, 1977

[51] Int. Cl.² .............................................. B01F 7/16
[52] U.S. Cl. ......................................... 366/98; 366/343
[58] Field of Search ............... 259/107, 108, 185, 182, 259/183, 84, 85, 106, 103, 102, 8, 24, 44

[56] References Cited

U.S. PATENT DOCUMENTS

| | | | |
|---|---|---|---|
| 1,884,120 | 10/1932 | Mross | 259/107 |
| 2,687,284 | 8/1954 | Gerber | 259/108 |
| 2,896,924 | 7/1959 | Jepson | 259/108 |
| 3,318,583 | 5/1967 | Wright | 259/108 |
| 3,749,373 | 7/1973 | Kemper | 259/185 |
| 3,995,840 | 12/1976 | Smader | 259/107 |

*Primary Examiner*—Robert W. Jenkins
*Attorney, Agent, or Firm*—Dallett Hoopes

[57] ABSTRACT

Dough hook attachment for a mixer comprises a frame having gear box with upward input shaft adapted to snap into beater collet, and tab portions which are trapped between the top of mixer pedestal and motor housing. Means to immobilize the bowl are provided.

5 Claims, 5 Drawing Figures

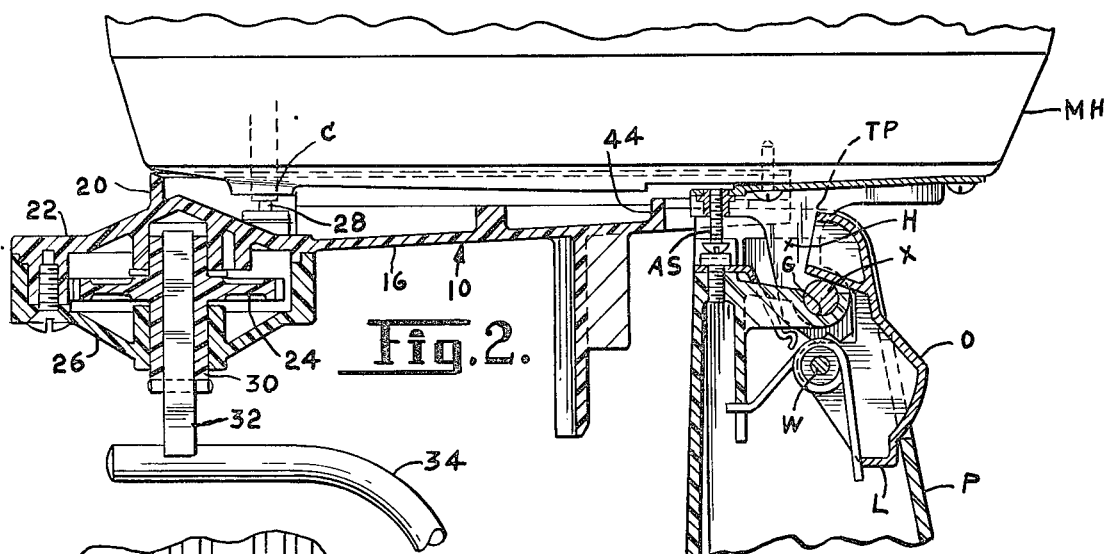
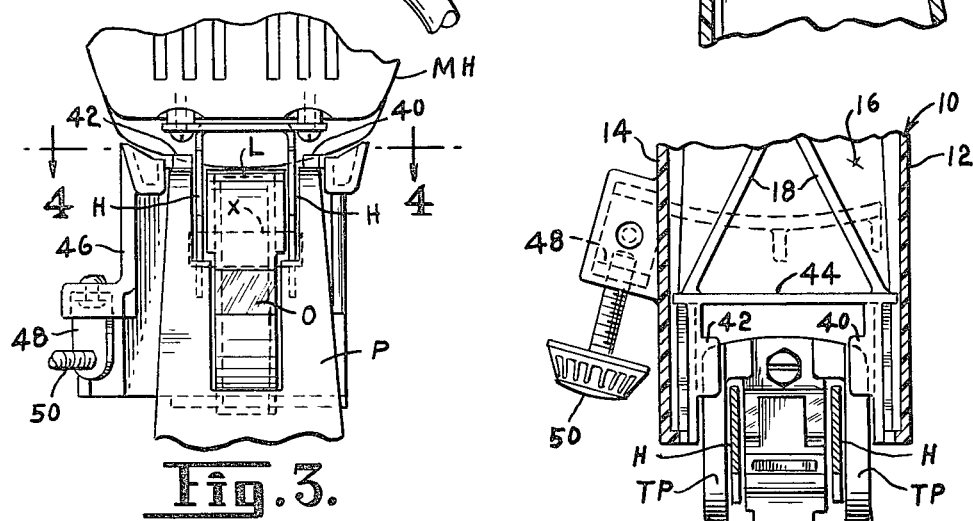
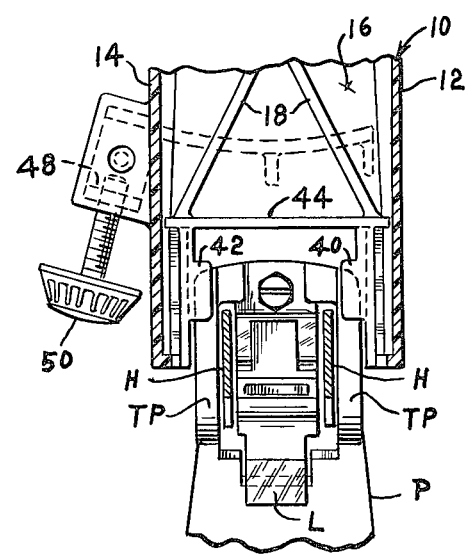
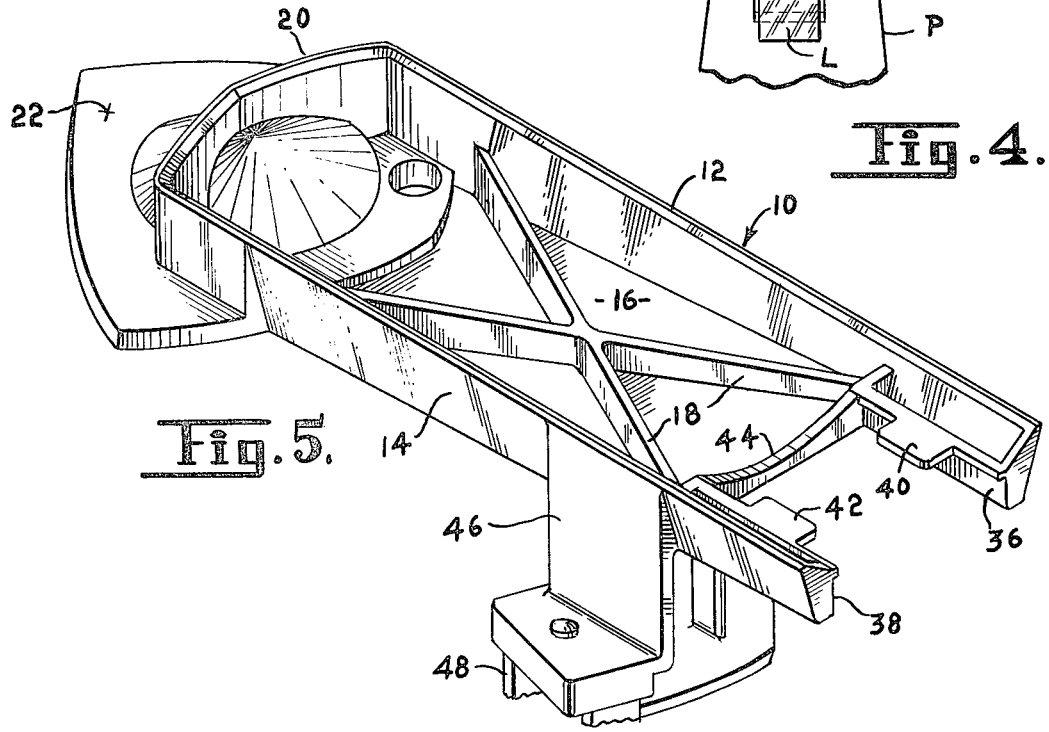

DOUGH HOOK ATTACHMENT FOR KITCHEN MIXER

BACKGROUND OF THE INVENTION

1. Field of the Invention

This invention relates to a dough hook attachment for a stand-type kitchen mixer. More specifically, the invention relates to a dough hook having novel means for attachment to a mixer whereby the dough hook is firmly held and yet is readily attached to and detached from, the mixer.

2. Description of the Prior Art

In the prior art, there are showings of dough hook attachments for more or less conventional mixers. An example is my own Pat. No. 3,995,840, issued Dec. 7, 1976. While the invention of my earlier patent is meritorious, it is limited to machines provided with clamp means which normally holds the beater-assembly-support of the mixer and may be used to hold the dough hook attachment. Many mixers do not have such clamp assemblies, and the present invention is aimed at such non-clamp-type mixers. The attachment of the invention is useful with many commercially available mixers.

SUMMARY OF THE INVENTION

Under the present invention, there is provided a frame having a dough hook gear box at one end with an upstanding shaft adapted to be engaged in one of the mixer beater collets. The opposite end of the frame is provided with pad means adapted to be trapped between the upper end of the mixer pedestal and the undersurface of the motor housing. This relatively simple attachment offers secure support for the mixer even when worked on the thickest of cookie and bread doughs. At the same time, it provides for ready attachment and removal to and from the mixer.

BRIEF DESCRIPTION OF THE DRAWINGS

Other objects of the invention will be apparent from a reading of the following specification and an examination of the drawings, all of which disclose a non-limiting embodiment of the invention. In the drawings:

FIG. 2 is a fragmentary sectional view shown in profile in FIG. 1;

FIG. 3 is a fragmentary rear end view of the mixer of FIG. 2;

FIG. 4 is a sectional view taken on the line 4—4 of FIG. 3; and

FIG. 5 is a perspective view of a portion of the frame of an attachment embodying the invention, with portions broken away for ease of illustration.

DESCRIPTION OF THE PREFERRED EMBODIMENT

Figure 1:
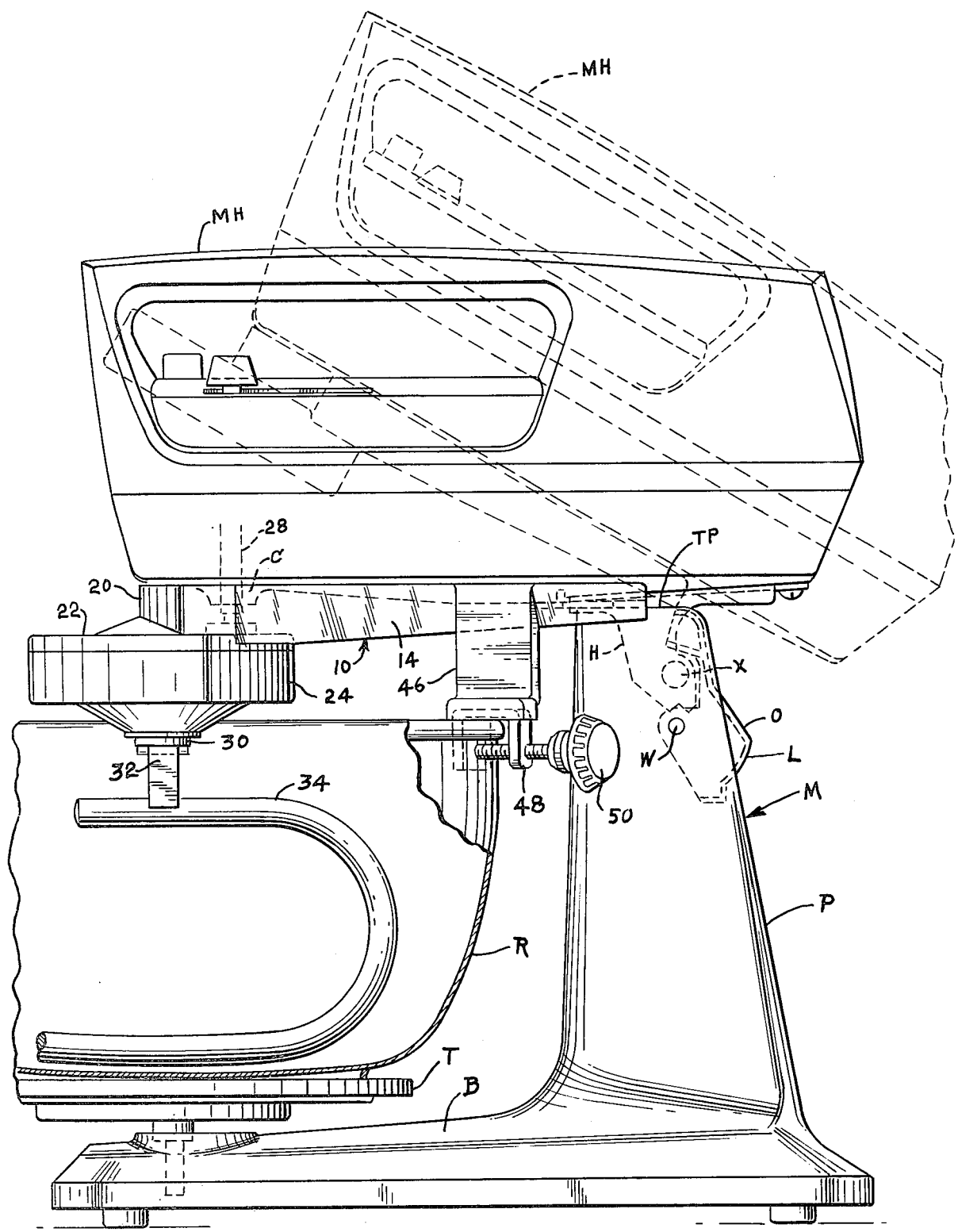
FIG. 1 is a side view of a mixer having an attachment embodying the invention, the motor housing of the mixer shown in pivoted-up position in dotted lines. Portions of the housing and bowl are broken away for ease of illustration.

Referring more specifically to the drawings, a mixer embodying the invention is generally designated M in FIG. 1 and comprises a base B and a pedestal P. The pedestal has an upper end featuring a top portion TP. A pin X is disposed horizontally between spaced legs H extending down from the lower portion of the motor housing MH, and rests in groove G on the pedestal top. The latch L, having operator O, pivots about its own pivot W with spring means as shown, biasing it in lock position. In this position, the upper end of the latch holds down the pin X in groove G. This holds the pedestal and motor housing together.

The motor housing MH is provided with a collet C adjacent its distal end, the collet C normally receiving one of the beaters of such a mixer.

A turntable T is provided normally receiving a mixing receptacle R.

Attention is now focused on the portions of the drawings which show the attachment. As shown, the attachment comprises the frame 10 (FIG. 5). The frame includes a pair of sidewalls 12 and 14 and a bottom wall 16 which is strengthened by cross ribs 18. The front ends of the sidewalls 12, 14 are connected by a front end wall 20.

Integrally formed on the underside of the sidewalls and end wall 20 is the top wall 22 of a gear box (FIG. 2). The gear box includes a lower housing portion 26 and the reduced speed gearing generally designated 24 and comparable to that shown in my earlier-mentioned patent. The gear box is provided with an input shaft 28 which operatively engages in the collet C in the conventional manner as shown in the above-mentioned patent. The gear box is also provided with a downward spindle 30 which drivingly engages the removable shank 32 of the dough hook 34.

As shown in FIG. 5, the rearward ends of the sidewalls 12, 14 are formed from their lower portion with upward support walls 36, 38, respectively. Extending in from the upper end of the support walls are the pads 40, 42. A strengthening rib 44 terminates the inward end of the bottom wall 16 of the frame.

As shown in FIGS. 1 and 5, the sidewall 14 is formed with an integral downward leg 46 having a downwardly directed C-clamp 48 having one leg drilled and tapped to receive a thumb screw 50. In use, the rim of the receptacle R is positioned between the legs of the C-clamp 48, and the thumb screw 50 is tightened to immobilize the receptacle. This blocks the tendency of the receptacle R to rotate in the same direction as the hook 34.

In assembly, the motor housing MH is pivoted up as shown in dotted lines in FIG. 1. Subsequently, the shaft 28 of the gear box is inserted up into the collet C in snap-in fashion as is conventional. The rear end of the frame 10 is then maneuvered into position in alignment with and against the underside of the motor housing MH. Subsequently, when the motor housing is allowed to drop down to the full line position shown in FIG. 1, the pads 40, 42 overlie the top portions TP of the pedestal P. The weight of the motor housing holds the pads downward, preferably in engagement with the top portion TP but at least traps the pads between the lower side of the motor housing and the top portions TP. As a result, the attachment of the unitary frame gear box structure to the mixer is relatively sturdy and not subject to inadvertent displacement. If desired or necessary, the adjustment screw AS (FIG. 2) can be adjusted to raise or lower the rest position of the motor housing with respect to the pedestal.

It is believed that the present attachment is meritorious in that it provides an easy and effective way to firmly attach a dough hook assembly to a more or less conventional mixer. The attachment is sturdy enough so that the hook 34 can operate on the heaviest doughs without unintentional disengagement.

While the invention is shown in the one embodiment, it is clearly not so limited but is susceptible of definition by the following claim language or equivalents thereof:

I claim:

1. For a kitchen stand-type food mixer having a base adapted to receive a mixing bowl, an upstanding pedestal at one end of the base, the pedestal having a substantially horizontal top portion, and a mixer motor housing pivotally attached to the top of the pedestal extends from the attachment to the top portion and is cantilevered out over the base, the housing having at its distal end a downwardly-facing collet adapted to drivingly engage a mixer beater, a dough hook attachment comprising:
   a. a rigid frame presenting at one end a gear box having an upstanding drive shaft adapted to operatively engage said collet and a downwardly-directed spindle, the opposite end of the frame having integral pad means adapted to rest on the top portion of the pedestal and to be held firmly down thereagainst by the underside of the housing; and
   b. a dough hook having an upward shank drivingly engaging the spindle and extending downward to operate in the bowl;
whereby the engagement of the shaft and the collet and holding of the pad means between pedestal and housing securely holds the attachment on the mixer.

2. A dough hook attachment as claimed in claim 1 wherein the frame presents intermediate its ends downward clamp means adapted to engage the rim of the bowl to immobilize it.

3. A kitchen stand-type food mixer having a base adapted to receive at one end a mixing receptacle, an upstanding pedestal at the other end of the base, the pedestal having a top portion, and a mixer motor housing pivoted to the top of the pedestal and extending out over the base, the housing having at its distal end a downwardly-facing collet adapted to drivingly engage a mixer beater; and a dough hook attachment comprising:
   a. a rigid frame presenting at one end a gear box having an upstanding drive shaft adapted to operatively engage into said collet and a downward-directed spindle, the opposite end of the frame having integral pad means adapted to rest on the top portion of the pedestal and to be held immobilized thereagainst by the underside of the housing; and
   b. a dough hook having an upward shank drivingly engaging the spindle and extending downward to operate in the receptacle;
whereby the engagement of the shaft and the collet and the holding of the pad means between pedestal and housing securely holds the attachment on the mixer.

4. Structure as claimed in claim 3 wherein the frame is formed with clamp means adapted to engage the rim of the receptacle to hold it from rotating.

5. Structure as claimed in claim 3 wherein the pad means comprises a pair of flanges extending inward from the sides of the frame.

* * * * *